Dec. 4, 1956  H. J. FINDLEY  2,773,205
POWER TRANSMITTING APPARATUS
Filed June 3, 1952  2 Sheets-Sheet 2
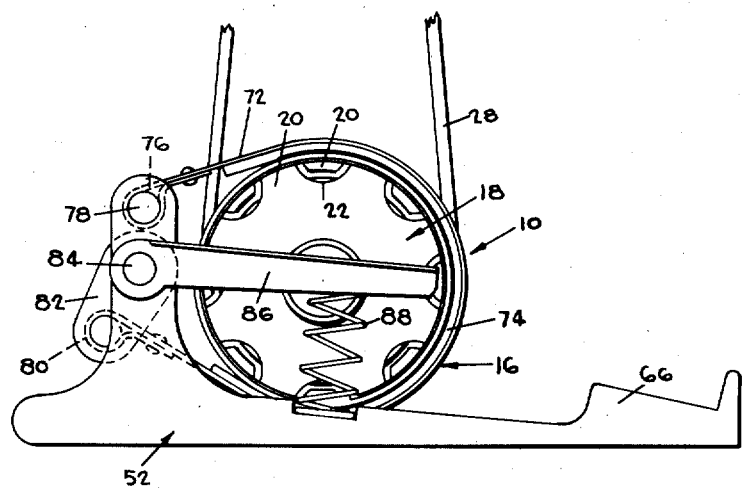
FIG_4
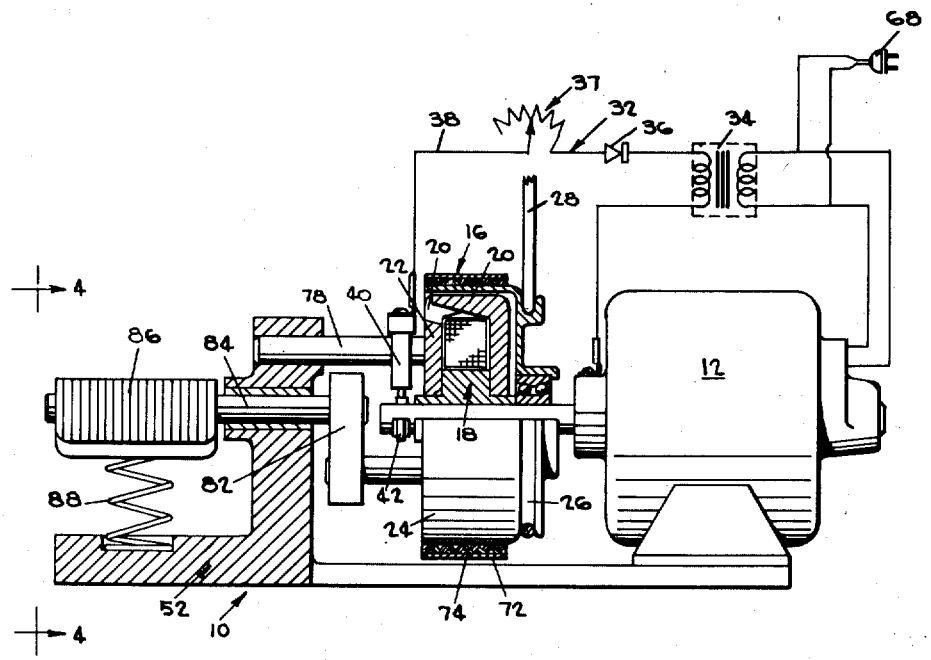
FIG_3
INVENTOR.
HOWARD J. FINDLEY
BY
*McDonald & Fragos*
ATTORNEYS United States Patent Office 2,773,205
Patented Dec. 4, 1956

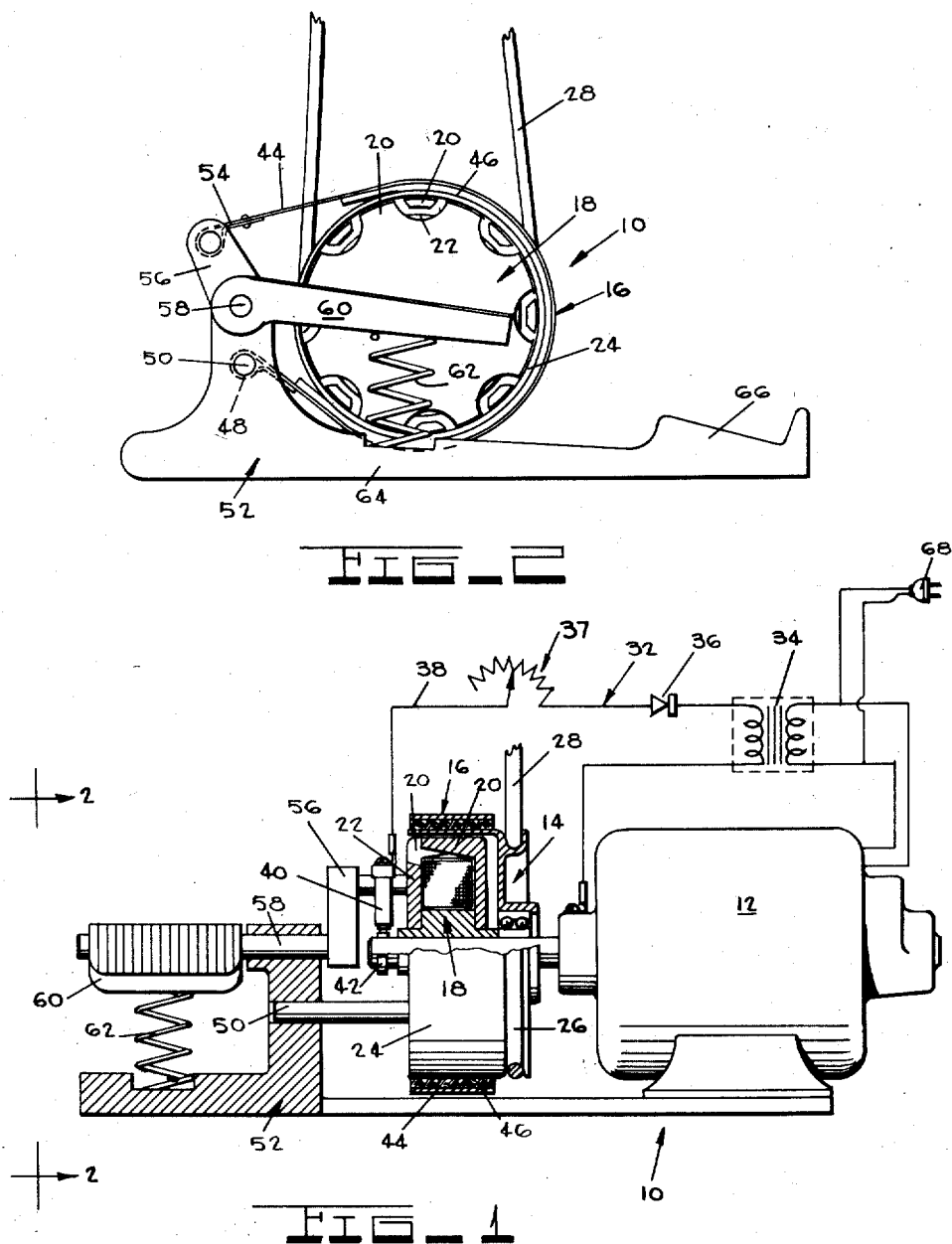

2,773,205
POWER TRANSMITTING APPARATUS

Howard J. Findley, Cleveland, Ohio, assignor to Eaton Manufacturing Company, Cleveland, Ohio, a corporation of Ohio Application June 3, 1952, Serial No. 291,460

5 Claims. (Cl. 310—96)

This invention relates to power transmitting apparatus and more particularly to a friction brake controlled power driven electromagnetic clutch.

Broadly the invention comprehends the provision of power transmitting apparatus adaptable for the operational driving control of power sewing machines and the like utilizing an electromagnetic clutch as the power transmitting medium intermediate a power source, such as an electric motor, and a power input shaft or the like of a mechanism to be driven thereby and wherein a friction brake is adapted to be engageable with the output member of the clutch for effecting a braking operation of the mechanism to be driven by the clutch and is releasable from braking position when it is desired to deliver power to the mechanism to be driven.

Among the objects of the invention are the provision of a power transmitting friction brake controlled electromagnetic clutch apparatus that:

1. Is adaptable to power driven machinery for the simple operational control thereof;
2. Does not require the discontinuance of operation of the power source to disrupt power input to the machinery being driven;
3. Is quickly responsive to brake release to initiate operation of machinery being driven;
4. Prevents overstressing of any of the parts of the machinery should interference be encountered in the operation thereof; and
5. Permits of the variable braking of the clutch for a modulated speed operation of mechanism to be driven thereby.

Other objects and advantages of the invention will appear from the following description taken in connection with the drawings forming a part of the specification; and in which:

Fig. 1 is a side elevation partly cross-sectionalized view of a power driven eddy current electromagnetic clutch friction brake controlled power transmitting mechanism;

Fig. 2 is an end elevation view of Fig. 1 looking substantially in the direction of lines 2—2 of Fig. 1;

Fig. 3 is a side elevation partly cross-sectionalized view of a modified form of power driven eddy current electromagnetic clutch friction brake controlled power transmitting mechanism; and Fig. 4 is an end elevation view of Fig. 3 looking substantially in the direction of lines 4—4 of Fig. 3.

This power transmitting apparatus was directed at the provision of means for simply and effectively controlling the input of power to machinery, such as power sewing machines and the like, wherein it is desired to repeatedly start and stop the operation thereof without necessity of discontinuing the operation of the source of power and also to vary the speed thereof such as in the initiation of a sewing operation. In so utilizing an electromagnetic clutch as a power transmitting mechanism between a power source and the machinery being driven it is possible by the application of a friction brake to the output member of the clutch to easily control the power output thereof. The brake can be arranged so that either a resilient load or operator applied braking force is imposed on the output member of the clutch such that with the power source on and the input of the clutch being driven therefrom slip results between the input and output members of the clutch. The heat generated due to the slipping of the clutch members is not excessive and in view of the generally limited periods in which the clutch will not be transmitting power therethrough it can be readily dissipated. In the case of the resiliently loaded arrangement, the operator is required to oppose the load to release the output member of the clutch so as to permit of its free rotation thereof and the consequent power delivery to the mechanism to be driven therefrom. On the other hand in the operator applied braking force arrangement, a resilient load acts to release the braking force from the clutch output member whereby the removal of an impressed load by the operator permits of the free rotation of the output member of the clutch.

An eddy current type of electromagnetic clutch is preferable for use in the apparatus although any of several types of electromagnetic clutches might equally as well serve the same purpose.

Referring to the drawings for more specific details of the invention 10 represents generally a power transmitting apparatus comprising basically an electric motor, source of power 12, an eddy current electromagnetic clutch 14 and a brake mechanism 16.

The eddy current electromagnetic clutch 14 is of conventional design comprising a rotor 18 having interdigitated polar teeth 20 on its external peripheral surface and supporting an electromagnetic coil 22 and a drum member 24, with its internal peripheral surface in close spaced relation to the teeth 20 on the rotor, including a sheave 26 integral therewith for receipt of a belt 28 adapted to transmit the rotation of the drum to machinery, not shown, to be driven thereby.

Whereas the rotor is fixedly secured to an output shaft 30 of the motor 12, the drum member 24 is journalled on the shaft for free relative rotation to the rotor.

Both the electric motor 12 and coil 22 of the clutch receive their electrical current from a plug in source by way of common electrical system 32 including a transformer 34, a rectifier 36, and a rheostat 37, current for the coil being transmitted thereto by way of conductor 38, stationary brush 40, and conductor ring 42 insulatedly mounted on shaft 30, said conductor ring adapted to be appropriately connected to coil 32. The electrical system 32 is also appropriately connected to the motor 12 through suitable connections for the operation thereof.

The brake mechanism 16 comprises a wrap around band 44 having a suitable friction lining 46 engageable upon the external peripheral surface of the drum member 24 for resisting the rotation thereof. One end 48 of band 44 is anchored upon a stationary post 50 mounted upon a standard 52 whereas its other end 54 is secured to one end of a lever 56. The lever 56 has its other end affixed to a shaft 58 mounted for rotation upon standard 52 and having secured upon an opposite end thereof from the lever 56 a pedal 60 normally urged in one direction by a coil spring 62 to pivot lever 56 by way of shaft 58 to a position to apply the brake band 44. The spring 62 is mounted between a base portion 64 of the standard and the underside of pedal 60.

The base portion 64 of the standard 52 provides a heel rest reception part 66 permitting of easy manipulation of pedal 60 to release the brake band from drum 24 of the clutch.

With a plug 68 of the electrical system plugged in the electric motor is immediately placed into operation and simultaneously the electromagnetic coil is energized. As the motor is placed in operation the output shaft thereof is rotated resulting in rotating rotor 18 affixed thereto such that with the coil energized eddy currents are generated between the polar teeth of the rotor and the drum tending to rotate the drum. This rotation of the drum is resisted by the normal resilient holding position of the brake band 44 having its frictional lining 46 engageably in contact on the drum 24 with the consequence that the generated eddy currents between the rotor and drum are dissipated as heat.

When it is desired that power be transmitted through the clutch by way of drum 24 and belt 28 to machinery being driven thereby it is solely necessary for the individual operating the machinery to depress the pedal opposed by the load of spring 62 sufficient to move the lever 56 to a position releasing the band and friction lining thereof from engagement upon the drum's external peripheral surface and thus permit of the rotation thereof as induced by the generation of eddy currents between the rotor and drum tending to rotate the drum as the rotor is driven by the motor.

The machinery driven by the belt 28 from the clutch 14 can be easily and readily started and stopped, and speed modulated as necessity dictates merely by depressing the pedal or releasing the depressing load therefrom.

The apparatus of Figs. 3 and 4 is in all general respects like the apparatus of Figs. 1 and 2 but differs therefrom in that it employs a modified form of braking mechanism 70, from that utilized in the apparatus of Figs. 1 and 2.

Brake mechanism 70 comprises a wrap around band 72 having a suitable friction lining 74 adaptable for engagement upon the external peripheral surface of the drum member 24 for resisting rotation thereof. One end 76 of band 72 is anchored upon a stationary post 78 mounted upon standard 52 whereas its other end 80 is secured to one end of a lever 82. The lever 82 has its other end affixed to a shaft 84 mounted for rotation upon standard 52 and having secured upon an opposite end thereof from lever 82, a pedal 86 normally urged in one direction, by a coil spring 88 to pivot lever 82 by way of shaft 84, to a position to release the brake band 72 from engagement upon the drum.

With the brake band 72 normally maintained free from braking engagement on the drum member 24, a depression of the pedal 86 by the operator of the apparatus is required effective to overcome the resistance of the spring 88 and move the brake band 72 into braking engagement with the drum. The amount of braking force to be applied to the drum 24 will determine the extent of retardation or complete stopping thereof to the extent that a modulated speed of rotation of the drum and mechanism to be driven thereby can be accomplished.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A power transmitting apparatus comprising a standard, an electromagnetic clutch supported for rotation on the standard, including cooperative concentrically disposed driving and driven members, power means connected to the driving member of the clutch, a brake band engageable with the driven member of the clutch radially outwardly of the driving and driven members of the clutch, having one end anchored on the standard and its other end resiliently urged in a direction to impose a braking load on the driven member, means supported on the standard, engageable with the resiliently urged end of the brake band for actuating the brake band in opposition to the resilient load of the band and said brake band being selectively engageable and disengageable while said electromagnetic clutch is energized whereby said clutch slips when said brake is engaged.

2. Apparatus according to claim 1 wherein the power means is mounted on the standard on the opposite side of the clutch from the means.

3. Apparatus according to claim 1 wherein the standard comprises a flat platform and a part extending perpendicular from the platform and wherein the power means is mounted on the platform wherein the one end of the band is anchored on the part, and wherein the means is supported on the part.

4. A power transmitting apparatus comprising a standard including a platform and a supporting member extending perpendicular to the platform, an electric motor mounted on the platform, an electromagnetic clutch, disposed intermediate the motor and the supporting member, including cooperative driving and driven members, the driving member of which is connected to the output of the member, brake means engageable with the driven member including a brake band, having one end anchored on the support and its other end resiliently urged to brake load imposing relation on the driven member while said electromagnetic clutch is engaged, and means, pivotally supported on the supporting member, engageable with the other end of the brake band adapted to be actuated for opposing the resilient load on the brake band.

5. Apparatus according to claim 4 wherein the means includes a pedal, and wherein the resilient loading of the band is provided by a spring interposed between the standard and the pedal.

References Cited in the file of this patent

UNITED STATES PATENTS

| 1,193,105 | Wood | Aug. 1, 1916 |
| 1,259,861 | Henry | Mar. 19, 1918 |
| 1,479,034 | Fernow | Jan. 1, 1924 |
| 1,503,524 | Wells | Aug. 5, 1924 |
| 1,692,027 | De Long | Nov. 20, 1928 |
| 2,273,947 | Fischbein | Feb. 24, 1942 |
| 2,462,747 | Jacobs | Feb. 22, 1949 |
| 2,467,874 | Winther | Apr. 19, 1949 |
| 2,515,295 | Davis | July 18, 1950 |

FOREIGN PATENTS

| 325,364 | Germany | Sept. 13, 1920 |